(12) United States Patent
Jia et al.

(10) Patent No.: US 10,591,351 B2
(45) Date of Patent: *Mar. 17, 2020

(54) AMBIENT LIGHT SENSOR WINDOW COATINGS FOR ELECTRONIC DEVICES

(71) Applicant: Apple Inc., Cupertino, CA (US)

(72) Inventors: Zhang Jia, Santa Clara, CA (US);
Naoto Matsuyuki, Tokyo (JP);
Matthew S. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,650

(22) Filed: Apr. 4, 2019

(65) Prior Publication Data

US 2019/0234794 A1    Aug. 1, 2019

Related U.S. Application Data

(63) Continuation of application No. 15/293,204, filed on Oct. 13, 2016, now Pat. No. 10,288,476.
(Continued)

(51) Int. Cl.
*G01J 1/04* (2006.01)
*G01J 1/02* (2006.01)
(Continued)

(52) U.S. Cl.
CPC ........... *G01J 1/0418* (2013.01); *G01J 1/0219* (2013.01); *G01J 1/0233* (2013.01); *G01J 1/0247* (2013.01);
(Continued)

(58) Field of Classification Search
CPC ...... G01J 1/0418; G01J 1/0407; G01J 1/0295; G01J 1/4204; G01J 1/42; G01J 1/0219;
(Continued)

(56) References Cited

U.S. PATENT DOCUMENTS 7,957,762 B2    6/2011  Herz et al.
8,558,177 B2   10/2013  Chang et al.
(Continued)

FOREIGN PATENT DOCUMENTS

CN    1808184 A    7/2006
CN    1896780 A    1/2007
(Continued)

*Primary Examiner* — John R Lee
(74) *Attorney, Agent, or Firm* — Treyz Law Group, P.C.; G. Victor Treyz; David K. Cole

(57) ABSTRACT

An electronic device may have a display with a cover layer. An ambient light sensor may be aligned with an ambient light sensor window formed from an opening in a masking layer on the cover layer in an inactive portion of the display. To help mask the ambient light sensor window from view, the ambient light sensor window may be provided with a black coating that matches the appearance of surrounding masking layer material while allowing light to reach the ambient light sensor. The black coating may be formed from a black physical vapor deposition thin-film inorganic layer with a high index of refraction. An antireflection layer formed from a stack of dielectric layers may be interposed between the black thin-film inorganic layer and the display cover layer.

20 Claims, 7 Drawing Sheets

Related U.S. Application Data

(60) Provisional application No. 62/270,295, filed on Dec. 21, 2015.

(51) Int. Cl.

| | | |
|---|---|---|
| *G01J 1/42* | (2006.01) | |
| *G01J 3/02* | (2006.01) | |
| *G01J 3/50* | (2006.01) | |
| *G02B 1/116* | (2015.01) | |
| *G09F 9/00* | (2006.01) | |
| *G02B 1/115* | (2015.01) | |

(52) U.S. Cl.
CPC .......... *G01J 1/0271* (2013.01); *G01J 1/0407* (2013.01); *G01J 1/0422* (2013.01); *G01J 1/0459* (2013.01); *G01J 1/4204* (2013.01); *G01J 3/0205* (2013.01); *G01J 3/0213* (2013.01); *G01J 3/0216* (2013.01); *G01J 3/0264* (2013.01); *G01J 3/0272* (2013.01); *G01J 3/0283* (2013.01); *G01J 3/50* (2013.01); *G02B 1/115* (2013.01); *G02B 1/116* (2013.01); *G09F 9/00* (2013.01)

(58) Field of Classification Search
CPC ...... G01J 1/0233; G01J 1/0247; G01J 1/0271; G01J 1/0422; G01J 1/0459; G01J 3/0205; G01J 3/0213; G01J 3/0216; G01J 3/0264; G01J 3/0272; G01J 3/0283; G01J 3/50; G02B 1/115; G02B 1/113; G02B 1/111; G02B 1/11; G02B 5/20; G02B 1/10; G02B 1/116
See application file for complete search history.

(56) References Cited

U.S. PATENT DOCUMENTS

| | | |
|---|---|---|
| 8,912,480 B2 | 12/2014 | Pope et al. |
| 9,137,891 B2 | 9/2015 | Gibbs et al. |
| 9,466,246 B1 | 10/2016 | Jalava et al. |
| 9,645,008 B2 | 5/2017 | Jia et al. |
| 9,658,706 B2 | 5/2017 | Ahn |
| 9,790,126 B2 | 10/2017 | Matsuyuki et al. |
| 9,864,116 B2 | 1/2018 | Matsuyuki et al. |
| 10,288,476 B2 * | 5/2019 | Jia .................. G01J 1/0418 |
| 10,348,943 B2 * | 7/2019 | Rogers .................. H04N 5/2252 |
| 2001/0010884 A1 | 8/2001 | Guehler et al. |
| 2004/0217681 A1 | 11/2004 | Park et al. |
| 2008/0006762 A1 | 1/2008 | Fadell et al. |
| 2008/0158173 A1 | 7/2008 | Hamblin et al. |
| 2008/0165115 A1 | 7/2008 | Herz et al. |
| 2008/0316594 A1 | 12/2008 | Hashiguchi et al. |
| 2009/0015736 A1 | 1/2009 | Weller et al. |
| 2010/0030834 A1 | 2/2010 | de Brebisson |
| 2010/0078562 A1 | 4/2010 | Dinh et al. |
| 2011/0084198 A1 | 4/2011 | McCabe et al. |
| 2011/0108728 A1 | 5/2011 | Chang et al. |
| 2012/0125314 A1 | 5/2012 | Esteban et al. |
| 2012/0147303 A1 | 6/2012 | Yamada et al. |
| 2012/0243091 A1 | 9/2012 | Amm et al. |
| 2013/0048837 A1 | 2/2013 | Pope et al. |
| 2013/0063810 A1 | 3/2013 | Miyaguchi et al. |
| 2013/0188235 A1 | 7/2013 | Floyd et al. |
| 2014/0315592 A1 | 10/2014 | Schlub et al. |
| 2015/0062709 A1 | 3/2015 | Matsuyuki et al. |
| 2015/0064432 A1 | 3/2015 | Matsuyuki et al. |
| 2016/0054175 A1 | 2/2016 | Jia et al. |
| 2016/0093939 A1 * | 3/2016 | Kim .................. H01Q 1/243 343/720 |
| 2016/0131938 A1 | 5/2016 | Ji et al. |
| 2017/0176246 A1 | 6/2017 | Jia et al. |
| 2018/0067212 A1 | 3/2018 | Wilson et al. |
| 2018/0067245 A1 | 3/2018 | Giachino et al. |
| 2019/0234794 A1 * | 8/2019 | Jia .................. G01J 1/0219 |

FOREIGN PATENT DOCUMENTS

| | | |
|---|---|---|
| CN | 102095495 A | 6/2011 |
| CN | 102967362 A | 3/2013 |
| CN | 103688193 A | 3/2014 |
| WO | 2015122902 A1 | 8/2015 |
| WO | 2015136099 | 9/2015 |

* cited by examiner

| Layer | Material | Thickness [nm] |
|---|---|---|
| 1 | Al2O3 | 112.4 |
| 2 | TiO2 | 12.7 |
| 3 | Al2O3 | 48.5 |
| 4 | TiO2 | 27.4 |
| 5 | Al2O3 | 25.1 |
| 6 | TiO2 | 35.7 |

Rows 1–6 } 50

*FIG. 5*

AMBIENT LIGHT SENSOR WINDOW COATINGS FOR ELECTRONIC DEVICES

This application is a continuation of U.S. patent application Ser. No. 15/293,204, filed Oct. 13, 2016, which claims the benefit of provisional patent application No. 62/270,295, filed Dec. 21, 2015, each of which is hereby incorporated by reference herein in its entirety.

FIELD

This relates generally to electronic devices and, more particularly, to electronic device window coatings.

BACKGROUND

Electronic devices often contain displays. A display may have an active area with pixels that display images for a user and an inactive area alongside the active area. A layer of glass may serve as a protective display cover layer. The layer of glass may overlap the active area and the inactive area. To hide internal components from view, the inner surface of the inactive area may be covered with an opaque masking layer such as a layer of black ink. Windows in the display cover layer may be formed from openings in the opaque masking layer. Light-sensitive components may be aligned with the windows. For example, an ambient light sensor may be aligned with a window in a display.

To improve the outward appearance of the display cover layer in the inactive area, ambient light sensor windows may be covered with coatings of dark ink. Dark ink coatings for ambient light sensor windows are sometimes referred to as ambient light sensor inks. The presence of the ambient light sensor ink on an ambient light sensor will darken the outward appearance of the ambient light sensor window and thereby help visually blend the ambient light sensor window with surrounding portions of the layer of black ink in the inactive area. At the same time, the ambient light sensor ink will be sufficiently transparent to allow ambient light to reach the ambient light sensor that is aligned with the ambient light sensor window.

Although the presence of ambient light sensor ink on an ambient light sensor window may help improve device aesthetics, the presence of the ambient light sensor ink may introduce non-ideal characteristics to an ambient light sensor system. For example, ambient light sensor readings may vary as a function of the angle of incidence of incoming ambient light with respect to the ambient light sensor system.

SUMMARY

An electronic device may have a display with a cover layer. The cover layer may overlap an active area of the display that has an array of pixels that display images. The cover layer may also overlap an inactive area of the display without pixels. The inactive area of the display may have an opaque masking layer such as a layer of black ink.

An ambient light sensor may be aligned with an opening in the opaque masking layer that serves as an ambient light sensor window. To help mask the ambient light sensor window from view, the ambient light sensor window may be provided with a black coating or other dark coating that matches the appearance of the black ink while allowing light to reach the ambient light sensor.

The black coating may include a black physical vapor deposition thin-film inorganic layer with a high index of refraction. The thin-film inorganic layer may be, for example, a metal nitride such as aluminum titanium nitride. An antireflection and color adjustment layer may be interposed between the black thin-film inorganic layer and the display cover layer. The antireflection and color adjustment layer may be formed from a stack of dielectric layers such as a stack of metal oxide layers with alternating higher and lower indices of refraction.

BRIEF DESCRIPTION OF THE DRAWINGS

FIG. 5 is a diagram showing an illustrative stack of inorganic dielectric layers that may be used to implement an antireflection and color adjustment layer for a window coating in accordance with embodiment.

DETAILED DESCRIPTION

Figure 1:
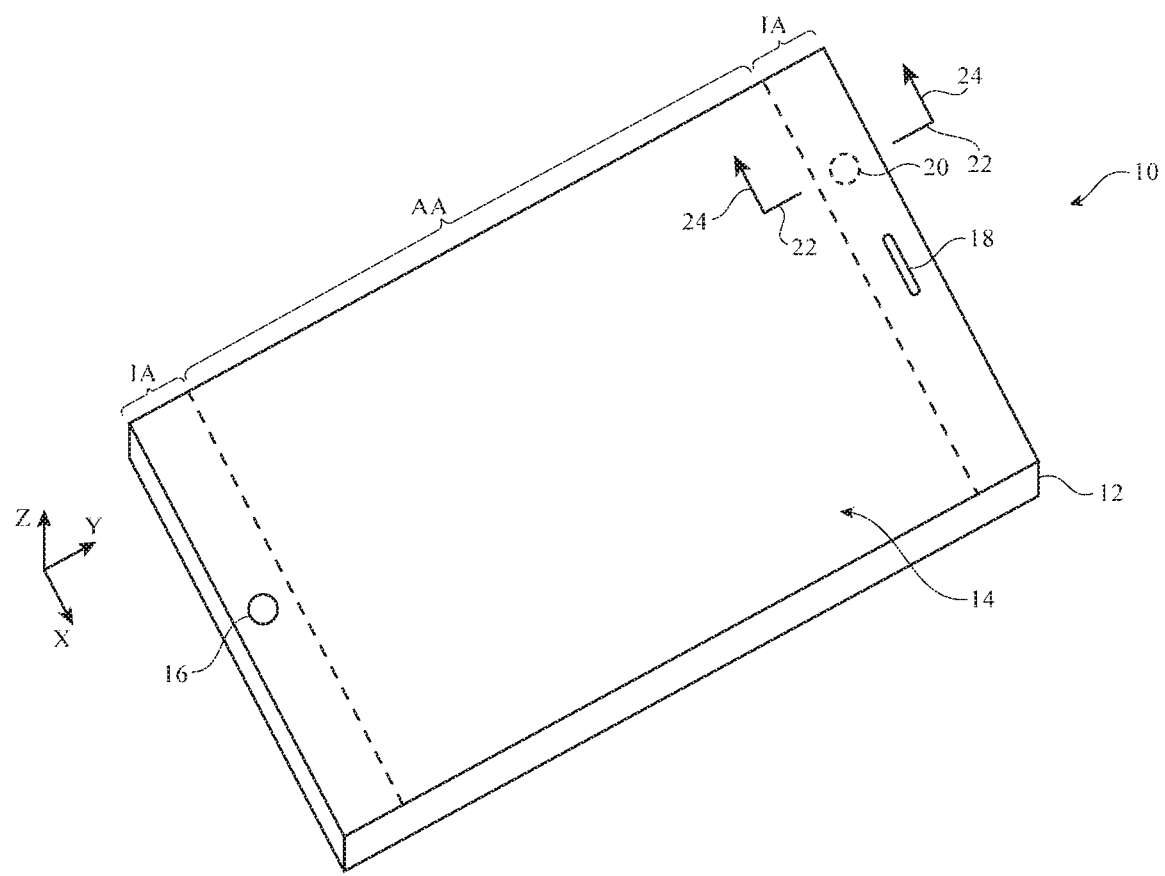
FIG. 1 is a perspective view of an illustrative electronic device in accordance with an embodiment.

Electronic devices may be provided with displays. A display may have an active area containing an array of pixels that is used to display images and an inactive area that is free of pixels. Circuitry and internal device components may be mounted under the inactive area.

A protective display cover layer for the display may be formed from a layer of transparent material. The display cover layer may overlap both the active area and the inactive area of the display. The portion of the display cover layer that overlaps the active area is free of ink and is transparent. An inner surface of the portion of the display cover layer that overlaps the inactive area may be coated with an opaque masking layer to help hide internal structures in the device from view by a user. The opaque masking layer may be formed from a polymer with light absorbing particles or other suitable opaque structure. The opaque masking layer may be, for example, a layer of black ink or an opaque layer of another color.

Openings may be formed in the opaque masking layer to form light-transmitting windows. These windows, which may sometimes be referred to as optical windows or light windows, may be used to accommodate light-based components. For example, a camera may capture images through a window in a display cover layer, an ambient light sensor may make measurements of ambient light levels through a window in the display cover layer, and a light-based proximity sensor may be used to make proximity sensor measurements though a window in the display cover layer. In some situations (e.g., when forming windows for components such as cameras that operate at visible light wavelengths), the windows may be transparent at visible wavelengths and may be free of any coating layers. In other situations, such as when forming a window for an ambient light sensor, it may be desirable coat the window so as to at least partly obscure the window. This may be accomplished, for example, by coating an ambient light sensor window with a dark coating that transmits sufficient ambient light to an ambient light sensor to allow the ambient light sensor to make ambient light measurements. The dark appearance of the coating may allow the ambient light sensor window to blend in with the appearance of nearby portions of the black ink or other opaque masking layer in the inactive area.

In general, window coatings for ambient light sensors may have any suitable color (e.g., white, gray, black, or other colors). These coatings may transmit any suitable amount of light (e.g., the transmission of these coatings may be greater than 50%, less than 50%, 5-20%, less than 30%, less than 20%, less than 10% or other suitable value). Coatings may be provided on windows for infrared and visible light cameras, for infrared components, for light sensing arrays associated with user input-output devices (e.g., touch sensors or fingerprint sensors), for proximity sensors, or for any other suitable light-based component in device 10. Configurations in which an ambient light sensor window is provided with a coating may sometimes be described herein as an example. This is, however, merely illustrative. Coatings may be provided on any suitable transparent window structure in device 10.

To ensure that a window coating has a desired appearance (e.g., a desired reflectivity, a desired color, a desired transmission at certain wavelengths, etc.), window coatings may be formed using thin-film stacks. For example, multiple thin layers of inorganic material may be deposited onto the inner surface of a display cover layer using physical vapor deposition techniques or other suitable techniques. By tuning the number of layers, the thicknesses of the layers, and the materials used in the layers of a coating, the coating can be provided with a desired external appearance and transmission properties. For example, a coating on the inner surface of an ambient light sensor window may serve as an antireflection and color adjustment layer that adjusts the amount of reflection from the window and the color of the window (e.g., to a bluish black color in configurations in which the opaque masking material in the inactive area of the display has a bluish black appearance). The coating may also be provided with thin-film layer of inorganic material that absorbs light (e.g., to ensure that the coating appears sufficiently black to blend with surrounding opaque masking structures).

FIG. 1 is a perspective view of an illustrative electronic device of the type that may include a display with windows for light-based components such as an ambient light sensor. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

In the example of FIG. 1, device 10 includes display 14. Display 14 has been mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Openings may be formed in housing 12 to form communications ports, holes for buttons, and other structures.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 14 may have an active area AA that includes an array of pixels. The array of pixels may be formed from liquid crystal display (LCD) components, an array of electrophoretic pixels, an array of plasma display pixels, an array of organic light-emitting diode pixels or other light-emitting diode pixels, an array of electrowetting pixels, or pixels based on other display technologies.

Display 14 may be protected using a display cover layer such as a layer of transparent glass, clear plastic, transparent ceramic, sapphire or other transparent crystalline material, or other transparent layer(s). The display cover layer may have a planar shape, a convex curved profile, a concave curved profile, a shape with planar and curved portions, a layout that includes a planar main area surrounded on one or more edges with a portion that is bent out of the plane of the planar main area, or other suitable shape. Openings may be formed in the display cover layer to accommodate button 16, ports such as speaker port 18, and other structures.

Display 14 may have an inactive border region such as inactive area IA that runs along one or more of the edges of active area AA. Inactive area IA may be free of pixels for displaying images and may overlap circuitry and other internal device structures in housing 12. To block these structures from view by a user of device 10, the underside of the display cover layer for display 14 may be coated with an opaque masking layer in inactive area IA. The opaque masking layer may have any suitable color. With one suitable arrangement, which may sometimes be described herein as an example, the opaque masking layer in regions IA of display 14 may be formed from a layer of black ink that is opaque at visible wavelengths.

Openings may be formed in the black ink coating on the underside of the display cover layer in inactive area IA. These openings may form windows for light-based components in device 10. In the example of FIG. 1, window 20 has been formed in inactive area IA along an upper edge of display 14. In general, windows such as window 20 may be formed in any suitable portion of display 14 (i.e., in other portions of inactive area IA) or other transparent structures in device 10. The configuration of FIG. 1 is merely illustrative.

Window 20 may be circular, rectangular, or may have other suitable shapes. Window 20 may be aligned with a light-based component such as an ambient light sensor and may have an ambient light sensor coating. The ambient light sensor coating is sufficiently transparent to allow ambient light to reach the ambient light sensor while being sufficiently close in appearance to surrounding portions of the opaque black masking layer in inactive area IA to help obscure window 20 from view by a user of device 10.

Figure 2:
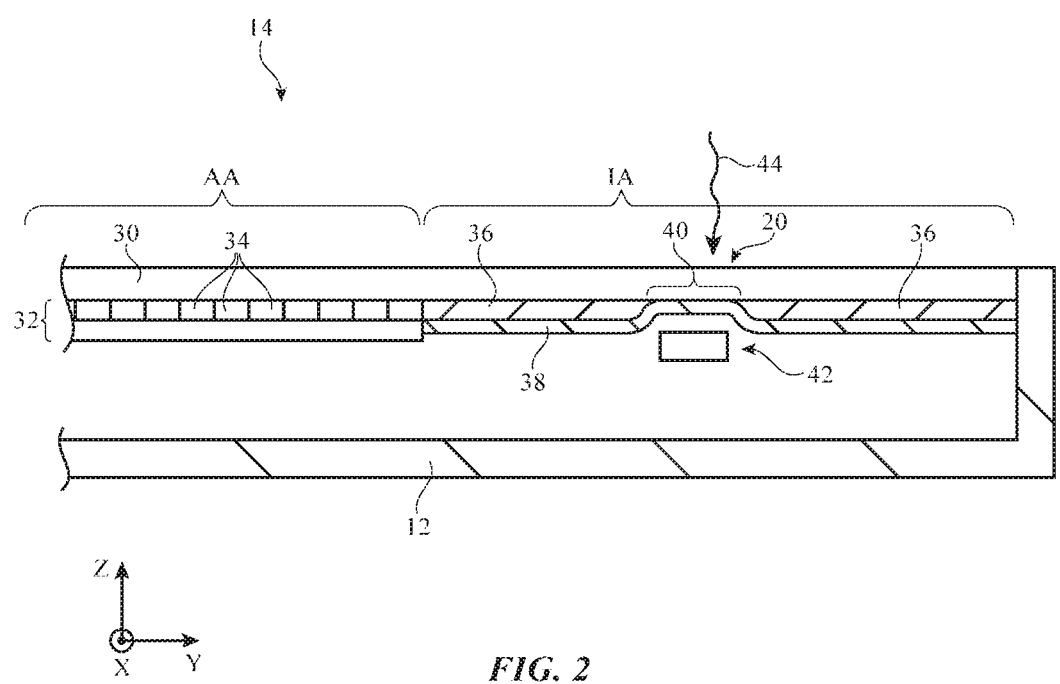
FIG. 2 is a cross-sectional side view of a portion of an illustrative electronic device with a window and an aligned light-based component such as an ambient light sensor in accordance with an embodiment.

FIG. 2 is a cross-sectional side view of a portion of device 10 of FIG. 1 in the vicinity of window 20 taken along line 22 of FIG. 1 and viewed in direction 24. As shown in FIG. 2, display 14 may have a transparent layer such as display cover layer 30. Display cover layer 30 may be formed from a transparent material such as glass, plastic, sapphire or other crystalline material, transparent ceramic, etc. In active area AA, display 14 may contain structures 32 (e.g., an organic light-emitting diode display layer, a liquid crystal display module, etc.) with an array of pixels 34 for displaying images.

The inner surface of display cover layer 30 may be coated with one or more layers of material in inactive area IA. In the example of FIG. 2, the underside of display cover layer 30 in inactive area IA has been coated with opaque masking layer 36. Opaque masking layer 36 may be, for example, a layer of black ink. Opening 40 for window 20 may be formed in opaque masking layer 36. Ambient light sensor coating layer 38 may overlap opening 40 and may provide window 20 with a desired appearance. For example, coating layer 38 may include antireflection structures for suppressing reflections from window 20, thin-film spectral tuning structures for adjusting the color of window 20, and structures for absorbing sufficient light to darken the appearance of window 20 and thereby match the appearance of masking layer 36.

As shown in FIG. 2, a light-based component such as component 42 may be aligned with window 20. Component 42 may be an ambient light sensor such as a color sensing ambient light sensor that measures ambient light 44. A color sensing ambient light sensor may have an array of detectors each of which measures the amount of light in a different respective color channel (e.g., blue, red, green, channels of other colors, channels that respond to combinations of two different colors, etc.). This allows the color sensing ambient light sensor to determine the color (color coordinates, color temperature, etc.) of ambient light in the environment surrounding device 10. The color sensing ambient light sensor may, for example, detect cold ambient lighting conditions when a user is in an outdoors shaded environment and warm ambient lighting conditions when a user is in an indoors tungsten lighting environment (as examples). Color information from the color ambient light sensor may be used to make color corrections to the colors displayed by pixels 34 in display 14 or to make other adjustments to the performance of device 10. If desired, one or more of the color channels in sensor 42 may be responsive to infrared light. Monochromatic ambient light sensors may also be used in device 10 (i.e., sensor 42 may be a monochromatic ambient light sensor).

Figure 3:
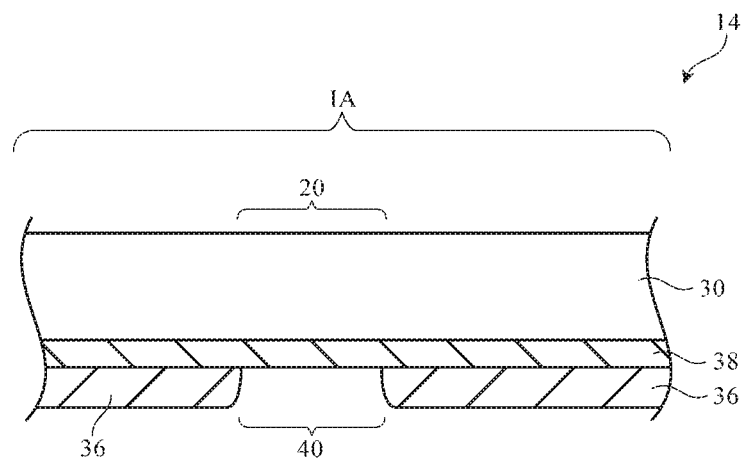
FIG. 3 is a cross-sectional side view of a portion of a display with a coated window in accordance with an embodiment.

In the example of FIG. 2, window coating 38 has been deposited over the inner surface of opaque masking layer 36 after opening 40 has been formed in layer 36. Layer 36 may be deposited and patterned using screen printing or other suitable techniques. If desired, coating 38 may be deposited on the inner surface of display cover layer 30 before depositing layer 36 and patterning layer 36 to form opening 40 for window 20 (see, e.g., FIG. 3). In configurations in which coating 38 has a sufficiently opaque appearance, some or all of opaque masking layer 36 may be omitted from inactive area IA.

Figure 4:
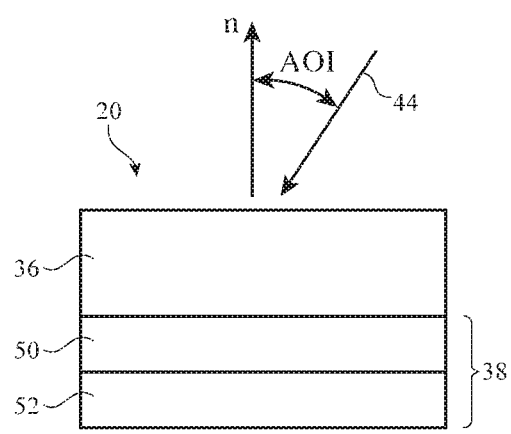
FIG. 4 is a cross-sectional side view of an illustrative window with a coating in accordance with an embodiment.

As shown in FIG. 4, incoming ambient light such as ambient light 44 of FIG. 2 may be characterized by a range of angles of incidence AOI with respect to surface normal n of the window 20 (i.e., the surface normal of the portion of display cover layer 36 in window 20). Coating 38 preferably exhibits a transmission characteristic that is not highly dependent on angle of incidence AOI. The appearance of coating 38 also preferably matches that of opaque masking layer 36 in attributes such as color and reflectivity.

With one illustrative configuration, coating 38 includes an antireflection and color adjustment layer such as layer 50. Materials such as black ink for opaque masking layer 36 may be formed from polymer containing particles of carbon black or other ink materials that have relatively low reflectivity. Accordingly, one or more thin-film dielectric layers or other thin-film layers in layer 50 may be formed in a stack to serve as an antireflection coating. The index of refraction of the one or more layers of antireflection material may be selected to reduce the light reflection from window 20 to a level that matches the light reflection from opaque masking layer 36.

If desired, the indexes of refraction, materials, and layer thicknesses of the materials in coating 38 (e.g., the spectral tuning structures of layer 50) may be selected to ensure that coating 38 has a desired color (e.g. a bluish black, or a color with another desirable spectral profile). Because thin-film interference effects can be used to adjust reflectivity and color, a wide variety of desired reflectivity values and colors can be implemented (e.g., by adjusting layer thicknesses, number of layers, and layer materials). Layer 50 can adjust antireflection and color properties associated with coating 38, so layer 50 may sometimes be referred to as an antireflection and color adjustment layer (antireflection layer, spectral tuning layer, color adjustment coating, etc.).

Coating layer 38 may also include one or more light absorbing layers such as layer 52. Layer 52 may, for example, be a dark material that absorbs sufficient light to make coating 38 appear black. The thickness of layer 52 may be sufficiently small to allow some of ambient light 44 to pass to ambient light sensor 42.

An illustrative configuration for antireflection and color adjustment coating 50 of FIG. 4 is shown in FIG. 5. In the example of FIG. 5, coating 50 has been formed from a stack of six inorganic dielectric layers (metal oxide layers): three aluminum oxide layers and three titanium oxide layers. The different index of refraction values for aluminum oxide (index 1.7) and titanium oxide (index 2.7) relative to each other and relative to the glass (index 1.55) of layer 30 allow layer 50 to serve as an antireflection layer (reducing reflections of visible light from window 20) and as a color adjustment (spectral adjustment) layer for window 20. In general, layer 50 may have any suitable number of dielectric layers (e.g., alternating higher and lower index of refraction layers or other patterns of dielectric layers with different indices of refraction), may have dielectric layers formed from metal oxides, silicon oxide, silicon nitride, other oxides, nitrides, oxynitride, or other inorganic materials. This stack of thin-film layers may be deposited using physical vapor deposition techniques (e.g., sputtering or evaporation) or other suitable deposition techniques.

Light absorption layer 52 may also be an inorganic layer that is deposited using physical vapor deposition or other suitable deposition techniques (e.g., layer 52 may be a black physical vapor deposition inorganic layer). To help reduce angle-of-incidence sensitivity, layer 52 may be formed from a material that has a relatively high index of refraction.

Figure 6:
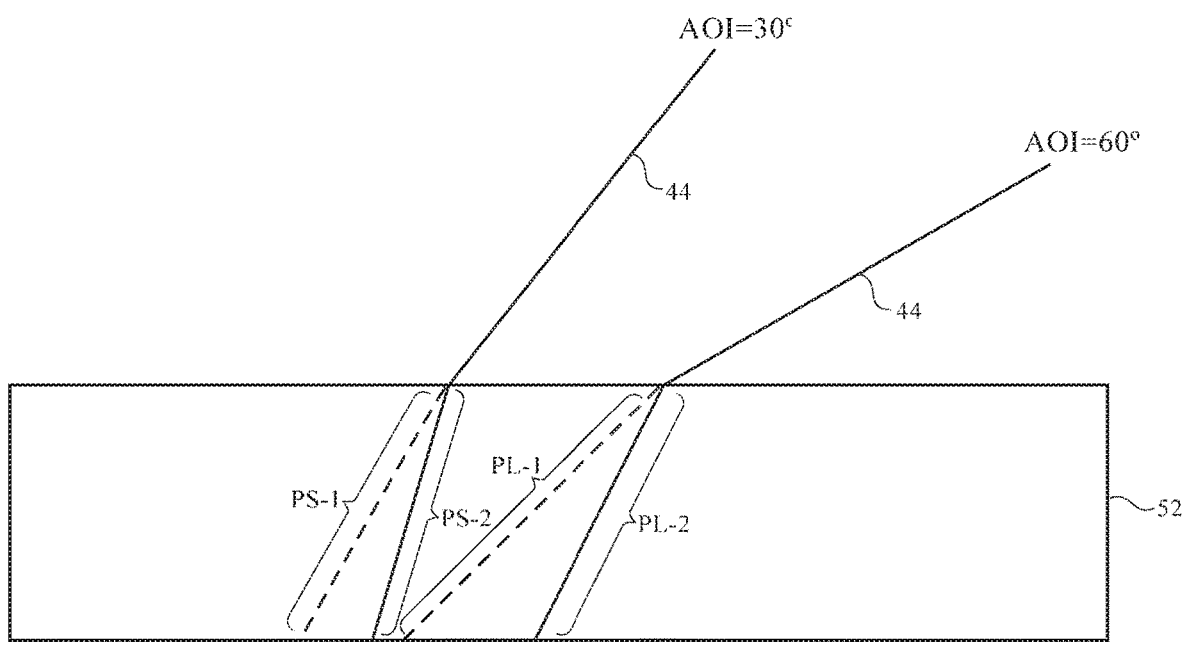
FIG. 6 is a cross-sectional side view of an illustrative coating layer showing how the index of refraction of the layer affects optical path lengths in the layer in accordance with an embodiment.

As shown in the cross-sectional side view of layer 62 of FIG. 6, incoming ambient light 44 may be characterized by various different angles of incidence. The example of FIG. 6 shows how light 44 may have an angle of incidence AOI of 60° or 30° (as examples). In situations in which the index of refraction of layer 52 is low (e.g., 1.6 or 1.7 as with polymer inks), light 44 will travel along paths such as short path PS-1 and long path PL-1, associated with angles of incidence AOI of 30° and an angle of incidence of 60°, respectively. This can create a significant path length difference (PL-1 minus PS-1) as the angle of incidence of ambient light 44 varies. In situations in which the index of refraction of layer 52 is high (e.g., 2.3 as with a material such as AlTiN or other suitable high-index thin-film inorganic layer), light 44 will travel along paths such as short path PS-2 and long path PL-2 (for respective angles of incidence AOI of 30° and) 60°. Due to the larger refractive index in this situation, light 44 is refracted more upon entering layer 52 and the path length difference PL-2 minus PS-2 will be smaller than path length difference PL-1 minus PS-1. The reduced path length changes that result from different angles of incidence when the refractive index of layer 52 is high help ensure that coating 38 and ambient light sensor 42 will be relatively insensitive to variations in ambient light angle of incidence.

Figure 7:
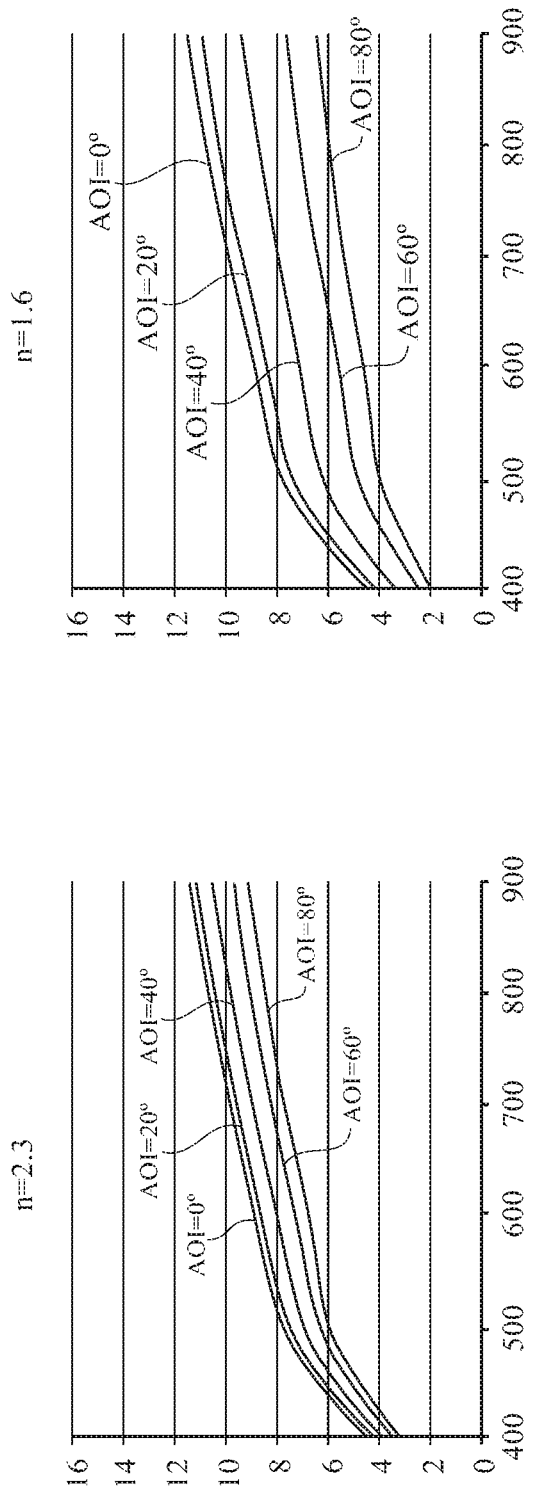
FIG. 7 contains a pair of graphs in which the transmission of an illustrative coating layer has been plotted as a function of wavelength for two different index of refraction values in accordance with an embodiment.

The simulations of FIG. 7 show the impact of this change in refractive index on the light transmission spectrum for an illustrative light absorption layer 52 under various illustrative angles of incidence AOI for light 44. In the graphs of FIG. 7, transmission T (%) has been plotted as a function of wavelength (in nm) as a function of five different values for angle of incidence AOI. In the simulation on the right side of FIG. 7, the index of refraction of layer 52 is 1.6 and the resulting spread between the transmission values T is large. In the simulation on the left side of FIG. 7, the index of refraction of layer 52 is 2.3 and the resulting spread between transmission values T at different angles of incidence is reduced. The use of a refractive index of 2.3 or larger for layer 52 (or at least an index larger than 1.7, larger than 1.8, larger than 1.9, larger than 2.0, larger than 2.1, or larger than 2.2) will therefore help reduce angle-of-incidence sensitivity for sensor 42. Spectral variations in the transmission of coating 38 that do not vary with angle of incidence can be compensated during light sensor calibration operations during manufacturing (e.g., in scenarios in which ambient light sensor 42 is a color ambient light sensor).

An example of a material that absorbs visible light to produce a black color for coating 38 and window 20 and which may therefore be suitable for use in forming light absorbing layer 52 in coating 38 is aluminum titanium nitride. This material has an index of refraction of 2.3 and can be deposited by sputtering aluminum and titanium in a nitrogen atmosphere (as an example). Other materials may be used, if desired (e.g., metals, dielectrics, nitrides, metal nitrides other than AlTiN, other inorganic materials, etc.). The use of aluminum titanium nitride in forming a visible light absorbing physical vapor deposition thin-film coating for window 20 is merely illustrative. The thickness of coating layer 52 may be 400 nm, 200-600 nm, less than 700 nm, less than 500 nm, more than 50 nm, more than 100 nm, more than 300 nm, or other suitable thickness and may be deposited using physical vapor deposition or other suitable deposition techniques. The visible light transmission of layer 52 and coating 38 may be less than 50%, less than 30%, less than 20%, less than 10% or other suitable amount. Layer 52 may be a black inorganic thin-film layer so that coating 38 has a black appearance or layer 52 and/or coating 38 may be formed from other materials with other colors. The use of sputtered inorganic layers of material for layer 52 allows these layers to be deposited accurately (e.g., film thickness may be controlled within 2%) and may be smooth, thereby reducing light scattering that might otherwise make window 20 visible against masking material 36.

The foregoing is merely illustrative and various modifications can be made by those skilled in the art without departing from the scope and spirit of the described embodiments. The foregoing embodiments may be implemented individually or in any combination.

What is claimed is:

1. An electronic device having an interior and an exterior, the electronic device comprising:
    a display;
    a transparent structure that has a first surface that faces the interior and an opposing second surface; and
    a coating on the first surface of the transparent structure, wherein the coating has a physical vapor deposition thin-film coating and a stack of dielectric layers interposed between the physical vapor deposition thin-film coating and the transparent structure.

2. The electronic device defined in claim 1 wherein the transparent structure comprises a display cover layer for the display.

3. The electronic device defined in claim 2 wherein the display has an active area and an inactive area and wherein the coating overlaps the inactive area.

4. The electronic device defined in claim 1 wherein the physical vapor deposition thin-film coating comprises a metal nitride.

5. The electronic device defined in claim 4 wherein the physical vapor deposition thin-film coating comprises aluminum titanium nitride.

6. The electronic device defined in claim 1 wherein the transparent structure comprises a material selected from the group consisting of: glass, plastic, ceramic, and sapphire.

7. The electronic device defined in claim 1 further comprising a light sensor, wherein the transparent structure has a portion forming a window that is aligned with the light sensor.

8. The electronic device defined in claim 7 wherein the coating is in the window of the transparent structure and wherein light incident on the transparent structure passes through the window and the coating to reach the light sensor.

9. The electronic device defined in claim 8 wherein the light sensor is a color sensing light sensor.

10. An electronic device having an interior and an exterior, the electronic device comprising:
    a transparent layer having a first surface that faces the interior and an opposing second surface;
    a display that is overlapped by the transparent layer; and
    a coating on the first surface of the transparent layer, wherein the coating includes a physical vapor deposition thin-film coating and an antireflection coating between the physical vapor deposition thin-film coating and the transparent layer.

11. The electronic device defined in claim 10 further comprising a color sensing light sensor, wherein the transparent layer has a window and the color sensing light sensor is aligned with the window.

12. The electronic device defined in claim 11 wherein the coating is interposed between the color sensing light sensor and the window.

13. The electronic device defined in claim 10 wherein the antireflection coating comprises a plurality of thin-film layers, and wherein at least some of the thin-film layers of the plurality of thin-film layers have different indices of refraction.

14. The electronic device defined in claim 13 wherein the plurality of thin-film layers are formed from materials selected from the group consisting of: metal oxides, silicon oxide, silicon nitride, and oxynitride.

15. An electronic device comprising:
- a transparent structure;
- a display that is overlapped by the transparent structure; and
- a coating on a portion of the transparent structure, wherein the coating comprises a physical vapor deposition thin-film coating and a stack of dielectric layers interposed between the physical vapor deposition thin-film coating and the transparent structure.

16. The electronic device defined in claim 15 wherein the physical vapor deposition thin-film coating is configured to allow some light incident on the transparent structure to pass through the coating.

17. The electronic device defined in claim 16 wherein the physical vapor deposition thin-film coating is less than 500 nm thick.

18. The electronic device defined in claim 15 wherein the stack of dielectric layers comprises a stack of metal oxide layers having alternating higher and lower indices of refraction.

19. The electronic device defined in claim 15 wherein the transparent structure comprises a window, the electronic device further comprising:
- a light sensor that is overlapped by the window in the transparent structure.

20. The electronic device defined in claim 19 wherein the light sensor is a color sensing light sensor and wherein the coating is interposed between the color sensing light sensor and the transparent structure.

* * * * *